United States Patent [19]

I

[11] Patent Number: 5,711,637
[45] Date of Patent: Jan. 27, 1998

[54] PROCESS OF PREVENTING LIQUEFACTION OF STRUCTURE FOUNDATION GROUND

[76] Inventor: Tsukio I, 1378, Kaminofu, Shingu-machi, Kasuya-gun, Fukuoka-ken, Japan

[21] Appl. No.: 603,971

[22] Filed: Feb. 20, 1996

[30] Foreign Application Priority Data

Dec. 18, 1995 [JP] Japan .................... 7-347523

[51] Int. Cl.$^6$ .................................................. E02D 3/12
[52] U.S. Cl. .................... 405/229; 405/258; 405/263
[58] Field of Search ........................... 405/263, 258, 405/264, 229; 106/900

[56] References Cited

U.S. PATENT DOCUMENTS

| | | | |
|---|---|---|---|
| 3,876,439 | 4/1975 | Schneider | 106/900 X |
| 4,266,980 | 5/1981 | Chudo et al. | 106/900 X |
| 4,655,839 | 4/1987 | Chao et al. | 106/900 X |
| 4,988,238 | 1/1991 | Szekely et al. | 405/263 |
| 5,456,553 | 10/1995 | Ii et al. | 405/263 |
| 5,501,719 | 3/1996 | Shida et al. | 405/263 X |

FOREIGN PATENT DOCUMENTS

| | | | |
|---|---|---|---|
| 0020609 | 2/1978 | Japan | 106/900 |
| 0053587 | 3/1985 | Japan | 405/263 |
| 645925 | 6/1994 | Japan | . |
| 790271 | 4/1995 | Japan | . |

*Primary Examiner*—Dennis L. Taylor
*Attorney, Agent, or Firm*—Jordan and Hamburg

[57] ABSTRACT

In a process of preventing liquefaction of the structure foundation ground, the ground where the structure weight is supposed to produce distribution of relatively large stress in the event of earthquakes is reinforced with a Iron-Lime stabilized soil that is highly resistant to water and is able to connect hard and soft portions in a well balanced manner, thereby forming a buffer layer against impacts to improve safety of the pile foundation and prevent liquefaction of the foundation ground. To this end, the depth at which the load stress due to a structure to be constructed is equal to the bearing capacity of the existing ground is determined, the equivalent depth converted from the aforesaid depth on an assumption that the modulus of deformation is 21,000 kgf/cm$^2$ is determined, and a refilled portion of the structure underground corresponding to the equivalent depth is formed as a stabilized layer comprising natural soil iron oxide and lime.

4 Claims, 2 Drawing Sheets

PROCESS OF PREVENTING LIQUEFACTION OF STRUCTURE FOUNDATION GROUND

FIELD OF THE INVENTION

The present invention relates to a process of preventing liquefaction of the structure foundation ground by which the ground where the structure weight is supposed to produce distribution of relatively large stress, is reinforced with a Ferrum-Lime stabilized soil that is highly resistant to water and is able to connect hard and soft portions in a well balanced manner. The reinforcing layer forms a buffer layer against impacts applied in the event of earthquakes to improve safety of the pile foundation and prevent liquefaction of the foundation ground.

DESCRIPTION OF THE RELATED ART

Heretofore, there are two main methods of preventing liquefaction of the foundation ground: i.e., (1) method of preventing the occurrence of liquefaction itself, and (2) method of allowing liquefaction of the existing ground, but abating damage of the structure.

The former method is carried out primarily by improving the foundation ground, and the latter method is carried out by, for example, driving foundation piles so as to reach a layer having ground endurance of 100 tf/m² below about 20 m or more from the ground surface.

With recent earthquakes, however, many of the structures constructed in consideration of the above measures for preventing liquefaction and having an anti-seismic design have been destroyed. Thus, it has proved that the measures taken in the past on the basis of mechanical stability (safety) alone are insufficient, and it has confirmed that measures taking into account the field of environmental ground engineering as well are necessary.

More specifically, in order to prevent destruction of structures by liquefaction of the ground in the event of earthquakes, it is required to not only form an upper layer of the foundation ground in contact with the structure as a non-liquefying layer which is highly resistant to water, but also connect the upper structure and the lower ground by a reinforcing layer which endures to deformation, so that the lower ground can endure the upper weight and will not cause lateral fluidization, to thereby prevent the structure from falling down from vibrations produced in the event of earthquakes. To this end, the upper layer of the foundation ground must serve simultaneously as a non-liquefying layer and a reinforcing layer.

SUMMARY OF THE INVENTION

Therefore, a process of preventing liquefaction of the structure foundation ground, according to a first aspect of the present invention, comprises the steps of determining the depth at which the load stress due to a structure to be constructed is equal to the bearing capacity of the existing (original) ground, determining the equivalent depth converted from the aforesaid depth on an assumption that the modulus of deformation is 21,000 kgf/cm², and forming a refilled portion of the structure underground corresponding to the equivalent depth as a layer of stabilized soil comprising A or B below added with C or D below (referred to as "Iron-Lime stabilized soil" hereinafter):

A: natural soil
B: natural soil and broken stones
C: iron oxide and lime
D: an Al—Fe—Ti-base oxide composition mainly consisted of aluminum oxide, iron oxide and titanium oxide, or a mixture of aluminum oxide, iron oxide and titanium oxide (the composition or mixture being referred to as "Al—Fe—Ti-base oxide" hereinafter), and lime.

Also, according to a second aspect of the present invention, a contact portion of 2 m or more between a structure and the pile foundation is formed as a layer of the Ferrum-Lime stabilized soil having the modulus of deformation not less than 21,000 kgf/cm².

In view of the fact that measures taken in the past on the basis of mechanical stability (safety) alone are insufficient and that measures taking into account the field of environmental ground engineering as well are necessary, as mentioned above, the inventor focused on the foundation ground of the Leaning Tower of Pisa in Italy which has borne the biased loading weight of the upper building (tower) and has kept in balance for a long period of time, and analyzed the mechanical balance conditions between the foundation ground and an upper structure, with the foundation ground of the Pisa Tower as a ground model.

The Pisa Tower is a structure with a diameter of about 20 m and a height of 58 m. The stratum below the Tower consists of a sand layer covering the depth of about 10 m from the ground surface, and a clay layer covering the depth of about 40 m under the sand layer. It is also found that although the strength of the upper sand layer is varied to some extent in the horizontal direction, the Tower is slanted mainly due to deformation (settlement) of the under clay layer. The settlement of the Tower at the base ranges from 3.0 m (south end) to 1.2 m (north end) for 800 years and the mean value per year is 2.63 mm.

Assuming that the modulus of deformation ($E_1$) of the upper layer (sand layer) is in the range of 1,500 to 21,000 kgf/cm², the analysis was performed by studying the mechanical balance between the sand layer and the clay layer with respect to the loading weight (i.e., the ground contact pressure of the Pisa Tower). Results of the calculation are shown in Table 1 and FIG. 1. Tables are all located at the end of this specification.

While Table 1 shows the results when $E_1$ was assumed to be 1,500 and 6,000, the calculation was carried out similarly in the other cases. Also, the calculation was based on the following formulae and numerical values.

$$\text{Modulus of deformation } (E) = 100 \times CBR \tag{1}$$

$$\text{Bearing capacity of soft existing ground} = qu = 0.225 \times CBR \tag{2}$$

$$\sigma z = \frac{q}{2\pi} \left( \frac{m \cdot n}{(m^2+1)(n^2+1)^{1/2}} \cdot \frac{m^2+n^2+2}{(m^2+1)(n^2+1)} + \sin^{-1}\left[ \frac{m \cdot n}{[(m^2+1)(n^2+1)]^{1/2}} \right] \right) \tag{3}$$

The above formula (3) is Boussinesq's formula for determining, in a semi-infinite elastic body, the stress ($\sigma z$) at the depth (z) of the loaded corner undergoing the uniformly distributed rectangle load (q) over the loading plane with a width (b) and a length (l), wherein q (kgf/cm²) is the uniformly distributed load, b (cm) is the load width, l (cm) is the load length, z (cm) is the depth, m is l/z, and n is b/z.

$$z = h(E_1/E_2)^{1/3} \tag{4}$$

The formula (4) represents the equivalent-depth method by Barber. When an upper layer and a lower layer of the ground have different moduli of deformation from each other, the underground stress distribution provides a different value from that in the case of the uniform ground. Therefore, the equivalent-depth method by Barber is used to obtain the equivalent thickness of one of the upper and lower layers converted into the other, so that both the layers exhibit the same mechanical effect. In the formula (4), z is the depth of the uniform ground by Boussinesq, h is the thickness of the upper layer, $E_1$ is the modulus of deformation of the upper layer, and $E_2$ is the modulus of deformation of the lower layer.

$$1000(E_1)^{1/3} = h_x(E_2)^{1/3} = h(E)^{1/3} \quad (5)$$

The formula (5) is meant to determine the thickness of the Ferrum-Lime stabilized soil (layer) following the above formula (4). In the formula (5), $h_x$ is the equivalent thickness of the sand layer of 10 m=1000 cm converted into the clay layer, h is the equivalent thickness of the Ferrum-Lime stabilized layer, E is the modulus of deformation of the Ferrum-Lime stabilized layer, $E_1$ is the modulus of deformation of the sand layer, and $E_2$ is the modulus of deformation of the clay layer.

One practical example of the calculation process will now be described in connection with the case of (A) ($E_1$=1,500) in Table 1.

i) Given that the foundation ground has the one-layer structure of clay, the equivalent thickness $h_x$ of the sand layer converted into the clay layer is determined from both the initially assumed strength (CBR) of the clay layer end the formula (4).

<Example> As listed in (A) of Table 1, in the case where the assumptive CBR of the clay layer=2.2% and the modulus of deformation of the sand layer=1,500 kgf/cm², 
$1000 \times 1500^{1/3} = h_x 220^{1/3}$ $$\therefore h_x = 1,896 \, m$$

ii) Given $h_x$=z, the vertical stress (σz) at the depth z in an arbitrary point (x, y) is determined from the formula (3).

iii) The CBR value of the clay layer is determined by substituting the vertical stress (σz), which has been determined in ii), into the formula (2) and then compared with the initially assumed CBR value.

From the results of the foregoing calculation, the equivalent thickness of the clay layer at which the upper sand layer can keep the mechanical balance with respect to the under clay layer is given by the value obtained when the assumptive CBR value is closest to the calculated result, as indicated in the column marked by (*) in Table 1 (CBR=2.5). The mechanical relationship between the two layers of the foundation ground keeping in balance with the ground contact pressure of the Pisa Tower was thus made clear.

As is apparent from the above analysis, in the case where upper and lower layers are different in bearing capacity and strength from each other, an upper structure and the foundation ground are well balanced when the vertical stress (σz) acting upon the underside of the upper layer due to the structure weight is equal to the bearing capacity of the lower layer. Accordingly, a reinforcing layer formed on the existing ground is required to reduce the load stress down to a level not larger than the bearing capacity of the existing ground.

Next, Table 2 lists results of the calculation showing that if the large modulus of deformation (E=21,000 or more) is assured by reinforcing the ground, the stress acting upon the under soft layer is mitigated remarkably and only small stress of substantially the same magnitude acts upon respective points of the structure, e.g., the center and corners thereof.

It is also understood from the results shown in Table 2 that by assuring E=21,000 or more, only small stress of substantially the same magnitude acts upon respective points of the structure, e.g., the center and corners thereof, and hence lateral fluidization is prevented. In other words, to prevent lateral fluidization attributable to the structure weight, the modulus of deformation (E) of the ground is required to have a value not less than 21,000.

Further, FIG. 1 shows results of the calculation indicating stress distribution in terms of vertical stress, shear stress and horizontal stress. As is also seen from FIG. 1, with the modulus of deformation (E) being not less than 21,000, the acting range of each stress is reduced to a large extent. Particularly, there is a remarkable reduction in the value of each loading stress at the depth exceeding 2 m from the ground surface.

For the Iron-Lime stabilized soil used in the present invention, advantageous effects have been confirmed from many year's experiences of the inventor employing it in the roadbeds of pavements, the grounds of structures, etc. (see, e.g., Japanese Patent Publication No. 6-45925 and Japanese Patent Laid-Open No. 7-90271). The Ferrum-Lime stabilized soil has characteristics that water resistance is very superior and the modulus of deformation is increased with the elapse of days after the construction if the soil is subjected to the repeated load (vibrations).

More specifically, the Al—Fe—Ti-base oxide and lime are materials which exhibit very superior water resistance as a result of the fixed laws for chemical reactions and the chemical reactions explained below, and which tend to increase the modulus of deformation with the elapse of days after the construction if the soil is subjected to the repeated load (vibrations).

(1) There is the Le Chatelierr's law that a system in the equilibrium state has a tendency to react in such a manner as to return to the original equilibrium state even with any force acting upon the system. The equilibrium state exists by virtue of reversibility in the reaction.

(2) When the chemical reaction of aA+bB+... cC+dD+... reaches the chemical equilibrium, the ratio of concentrations [ ] of the components;

$$[C]^c[D]^d/[A]^a[B]^b = K$$

becomes a constant depending on temperature and pressure only. This is called the law of mass action or the law of chemical equilibrium, and K is called an equilibrium constant. The above formula is often applied to chemical equilibrium in a solution and, in this case, the constant is especially called a concentration equilibrium constant $K_c$.

(3) Swelling of clay increases in proportion to the ratio of silicon versus iron and aluminum, i.e., $SiO_2 / Fe_2O_3 + Al_2O_3$, in colloid and also changes depending on the nature of adsorbed cations.

Further, various materials in the colloidal state have characteristics of providing the large effective surface (interface), possessing an ability to fix and hold solids, gases, salts and ions, acting to promote or retard the contact action, i.e., the chemical reaction, and increasing the dissolution speed as the particle size reduces.

Elements contained in natural soil as constituent ingredients are in the form of silicate minerals, oxides and hydrated oxides, and are changed variously depending on external conditions such as the conditions of the location and the environment. Further, oxides and hydroxides of Fe and Al greatly affect physical and chemical properties of the soil along with silicate minerals. This is believed to be attributable to the fact that ion exchange radicals present on the surfaces of hydrated oxides of Fe and Al in the crystalline or amorphous form exhibit variation charge characteristics in which charges are varied depending on the pH-value of a solution.

More specifically, these hydrated oxides behave as cations or form anionic residual radicals depending on the reaction of a dispersion medium. Hydrated oxides of Fe and Al dissolve in an acidic solution as follows.

$$Fe(OH)_3 \rightarrow Fe^{3+} + 3OH^-$$

$$Al(OH)_3 \rightarrow Al^{3+} + 3OH^-$$

Less mobile Fe and Al ions remaining in the inner layer are responsible for cationic charges of particles. Then, in an alkaline solution, hydrated oxides of Fe and Al exhibit acidic properties and dissolve as follows.

$$H_3FeO_3 \rightarrow 3H^+ + FeO_3^{3-}$$

$$Al^{3+} + 4OH^- \leftarrow \rightarrow [Al(OH)_4]^-$$

In this case, less mobile $FeO_3$ remains in the inner layer (potential determining layer) and particles are given with cationic charges.

(4) Gedroiz places ions in order based on adsorption energy (difficulty in exudation) and solidifying ability, and calls the sequence the lyotropic series. The ions are arranged below in accordance with the lyotropic series:

$$Li^+ < Na^+ < NH_4^+ < K^+ < Mg^{2+} < K^+ < Mg^{2+} < H^+ < Ca^{2+} < Ba^{2+} < Al^{3+} < Fe^{3+}$$

The lyotropic series also means that adsorption energy and solidifying ability of ions increase with an increase in the atomic valence and, among the ions having the same atomic valence, they increase with an increase in the atomic weight. One exception in that general rule is a one-valence cationic H ion. Some scholars insist that an H ion has larger adsorption energy and solidifying ability than two-valence Ca and Mg ions.

(5) Transition of a colloid from a sol state to a gel state is called solidification and, on the contrary, transition from gel to sol is called peptization. Generally, a colloid is in a sol state when saturated with one-valence ions, and transits to gel and solidifies very strongly when charges are reduced upon one-valence cations being replaced by two- or three-valence cations.

Dense sol of clay in the form of iron hydroxide, aluminum hydroxide, etc. is liquefied when shaking it, but becomes gel if left to stand still. The phenomenon that sol and gel transit from one to the other reversibly depending on mechanical conditions is called thixotropy. This is probably attributable to the fact that a network structure is rebuilt after being destroyed once.

(6) $Ca^{2+}$ in lime substitutes for $H^+$ in a soil solution and thereby increases the pH-value of the soil and changes the physiological system of the soil. In other words, addition of lime increases the amount of lyotropic carbonate ($CaCO_3$) in the soil and raises the pH-value.

For example, when soil is left filled with water, the pH-value of the soil generally increases in acidic soil, but decreases in alkaline soil. In most types of soil, the pH-value is substantially stabilized to 6.5–7.0 after 4 to 12 weeks from the time when the soil was filled with water. A rising of the pH-value is mainly attributable to an increase in alkalinity due to creation of carbonates.

Such an increase in alkalinity in the reducing process can be explained from reaction formulae below:

$$5CH_2 + 4NO_3^- \rightarrow 4HCO_3^- + CO + 2N_2 + 3H_2O$$

$$CH_2O + 2Fe_2O_3 + 7CO_2 + 3H_2O \rightarrow 4Fe^{2+} + 8HCO_3^-$$

$$2CH_2O + SO_4^- \rightarrow 2HCO_3^- + H_2S \text{ (CH}_2\text{O: organic acid)}$$

Further, it is explained that hydroxides and carbonates of Fe(II) and Mn(II) settle with an increase in alkalinity and, therefore, the pH-value is stabilized nearly about neutral. For example, $Fe(OH)_2$ is precipitated in accordance with the following reaction formula:

$$Fe^{2+} + 2HCO_3^- \rightarrow Fe(OH)_2 + 2CO_2$$

Because part of the alkalinity transits from the liquid phase ($HCO_3^-$) to the solid phase [OH in $Fe(OH)_2$] through the above reaction, the pH will not rise above a certain value.

However, it is thought under weather conditions of much rain and high moisture like in Japan, $Ca^{2+}$ liquates out to acidify the soil (i.e., reduce the pH-value) again and, therefore, sustainment of the strength for a long period of time cannot be expected.

Solubility of many materials are significantly affected by the pH-value. An example of this principle is found in formation of laterite and bauxite. Stated otherwise, under natural conditions, mobility of aluminum is so low that it remains in most types of soil. Likewise, ferrum also remains in the solid phase in most types of soil. Two-valence ferrum is relatively mobile, but is easily oxidized to three-valence ferrum to produce an oxide having low solubility.

Accordingly, if an upper layer of the foundation ground is reinforced so as to realize the above-stated conditions by using the Iron-Lime stabilized soil, it is possible to prevent the occurrence of both liquefaction and lateral fluidization of the existing ground in the event of earthquakes, and to make the existing ground and the upper reinforcing layer well balanced against the structure weight.

While the present invention is seemingly analogous in part of the technological properties to Japanese Patent Publication No. 6-45925, entitled "Compaction settlement preventing process for physicochemically stabilizing natural soil and reinforcing soft ground", previously invented by the inventor, it is utterly different from the publicized patent in matters and constitution. More specifically, the publicized patent intends to reinforce a surface layer of the soft ground such that the surface layer becomes a layer deflecting in an amount not larger than the limit value against the structure weight, for the purpose of preventing compaction settlement of the structure. On the other hand, the important feature of the present invention is in providing a non-liquefying layer to prevent liquefaction in the event of earthquakes, and maintaining balance between the non-liquefying layer and an under layer so that the load stress at the underside of the non-liquefying layer is equal to the bearing capacity of the under layer. Thus, the publicized patent is different in object from the present invention and hence is not required to take the bearing capacity of the under layer into consideration.

Next, Table 3 shows the effect that deformation (settlement) of the foundation surface is reduced remarkably when the Iron-Lime stabilized layer is divided by using steel sheet panels.

In Table 3, O represents the center of an upper structure, A the corner, C the center of a long side at the end, and D the center of a short side at the end. The deformation of the foundation surface was calculated based on a following formula (6) on an assumption that the mean modulus of deformation is 6,000 just after the construction, 10,000 after four days and 21,000 after 28 days, and the Poisson's ratio (N) is 0.5. Also, it was assumed that the upper structure is a 4-floor building and the uniformly distributed rectangle load (q) is 0.4 kgf/cm² while 1 tf/m² in the first floor.

$$Wo = \frac{q \cdot b}{Es} (1-\mu^2) \frac{1}{\pi} \left( K \log_e \left[ \frac{1+(K^2+1)^{1/2}}{K} \right] + \log_e[K + (K^2+1)^{1/2}] \right) \quad (6)$$

In the formula (6), Wo is the displacement in the Z-direction (cm), Es is the modulus of elasticity of the ground (kgf/cm²), μ is the Poisson's ratio, b is the load width (cm), 1 is the load length (cm), and K is 1/b.

Further, Table 4 shows results of the calculation of stress acting on the center of the structure contact area with respect to the depth from the ground surface when the modulus of deformation of the ground is changed.

As is apparent from Tables 3 and 4, various effects such as the restraint pressure imposing by the steel sheet piles upon the filled-up soil, an increase in the strength (shear strength) of the Iron-Lime stabilized soil in each division with the elapse of days after the construction, and disappearance of the loading stress, are combined to more surely abate lateral fluidization and prevent liquefaction. It is also apparent that when the modulus of deformation of the ground is 21,000, all of vertical, horizontal and shear stress are reduced to a large extent at a depth not less than 2 m.

DETAILED DESCRIPTION OF THE PREFERRED EMBODIMENTS

Figure 1:
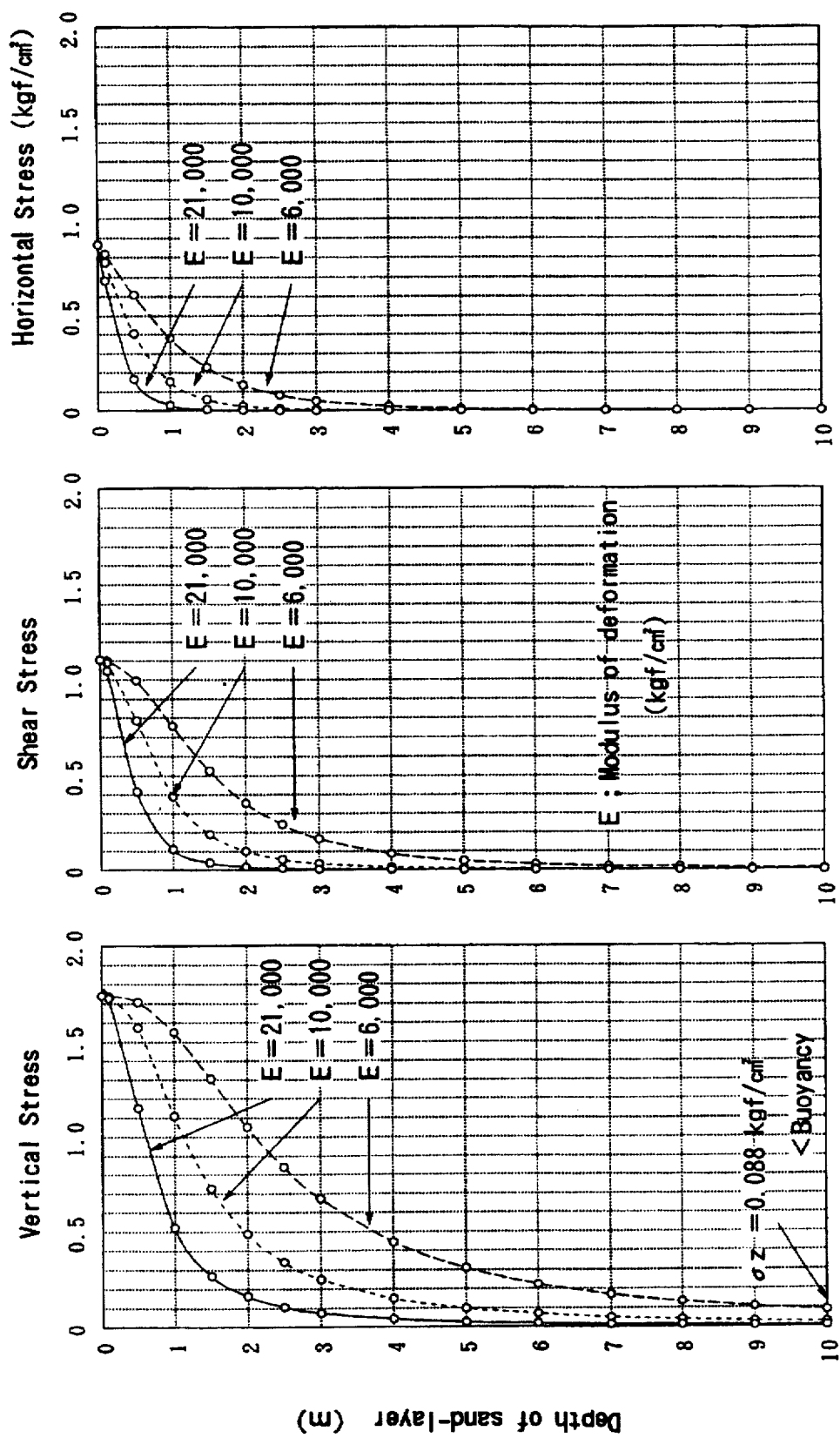
FIG. 1 is a graph showing influences upon stress distribution and the modulus of deformation when a sand layer of 10 m just below the center of the Pisa Tower is replaced by the Iron-Lime stabilized soil.

The present invention intends to prevent damage of an upper structure in the event of earthquakes by utilizing characteristics of the Iron-Lime stabilized soil and maintaining balance between the upper structure and the existing ground while preventing both liquefaction and lateral fluidization based on the newly established theory. The principles and features of the present invention will be described below.

1) Formation of Non-Liquefying Layer

The Iron-Lime stabilized soil is stabilized soil prepared following the chemical composition of two- and three-valence hydrate soil which are known as being resistant to water. Iron oxide acts to strengthen the skeleton structure of soil particles and also reacts with moisture in the soil to produce hydrated iron oxide (iron hydroxide), thereby giving rise to an elastic (viscoelastic) gelation due to inter-particle force (charge force of ions) of the produced ferrum hydroxide. As a result, the non-liquefying layer which will not soften with water is formed to restrain the under soft layer.

The gelation force is further intensified under application of (repeated) vibrations, and the modulus of deformation is gradually increased with the elapse of days after the construction. It is thus possible to achieve the structure design capable of semipermanently maintaining a restorable strain.

Furthermore, the Iron-Lime stabilized soil has characteristics adaptable to both the upper structure (hard portion) and the existing ground (soft portion). Therefore, the Iron-Lime stabilized soil of a sufficient thickness is well balanced with the upper structure and then forms one integral solid therewith to serve as a prop or support resisting liquefaction of the under layer, thereby reducing and suppressing displacement/deformation of the foundation ground and damage of the upper structure in the event of earthquakes.

2) Prevention of Horizontal Movement (Lateral Fluidization of Ground)

A phenomenon of the ground moving in the horizontal direction results from the entire ground deforming into the steady condition. Referring to Tables 2 and 3, for example, the displacement (settlement) at the center of the mat foundation is about twice that at the corner. Also, the displacement is increased as the size (contact area of the structure) becomes larger. This means that the loading weight acts upon the foundation ground unevenly. Thus, when the ground is going to remain in a balanced condition, it naturally moves (deforms) toward the portion undergoing less deformation. This movement appears as lateral fluidization.

The foundation ground is subjected to external pressure unevenly and irregularly due to differences in the weight (specific weight) of the structure and so on. The results of the trial calculation listed in Table 3 show the effects obtained when not only reinforcing the ground with the Ferrum-Lime stabilized soil so as to easily establish the shear strength capable of resisting against such external pressure and maintain the balanced condition, but also dividing the foundation ground and restraining sides of each division with the aid of steel sheet piles in consideration of stability and safety.

As is seen from Table 3, the shear resisting force and the restraint pressure are strengthened as the Iron-Lime stabilized soil is divided by steel sheet piles into smaller areas, whereby displacement/deformation appearing as settlement and lateral fluidization can be suppressed easily and early. As is also seen from Table 3, even if the Ferrum-Lime stabilized soil is not divided by steel sheet piles, it has a sufficient degree of the shear resisting force and the restraint force. It is therefore not always required to employ steel sheet piles. Additionally, the steel sheet pile process having been widely employed in the past intends to prevent outside soil from entering the foundation ground of the structure. By contrast, the steel sheet piles used in the present invention intend to prevent the soft existing ground from shifting horizontally (or fluidizing laterally) and hence avoid the entire foundation ground from deforming and destroying due to the weight of the upper structure and impacts applied in the event of earthquakes. In other words, the steel sheet piles used in the present invention serve to restrain the surroundings of the soft ground like a water pillow, thereby giving rise to the shear resisting force and the restraint force. Thus, as a result of dividing the foundation ground by the steel sheet piles, the shear resisting force and the restraint force of the entire foundation ground, including the Ferrum-Lime stabilized soil, are increased remarkably.

Further, as is apparent from Tables 3 and 4, when the modulus of deformation of the ground is 21,000, all of vertical, horizontal and shear stress are reduced to a large extent at a depth of not less than 2 m. It is therefore understood that reinforcing the ground portion at the depth until 2 m is effective to prevent liquefaction and suppress lateral fluidization in the event of earthquakes.

The Iron-Lime stabilized soil used in the present invention will now be described. Practically, the Iron-Lime stabilized soil can be prepared by various combinations below. So long as a modulus of deformation of not less than 21,000 is assured, any of the combinations is available.

(1) natural soil, iron oxide and lime
(2) natural soil, Al—Fe—Ti-base oxide and lime
(3) natural soil, broken stones, iron oxide and lime
(4) natural soil, broken stones, Al—Fe—Ti-base oxide and lime Basically, the combination of natural soil and broken stones can provide a larger modulus of deformation than natural soil alone. Also, the combination of ferrum oxide and lime can provide a larger modulus of deformation than the combination of Al—Fe—Ti-base oxide and lime. Any optional one of the combinations can be selected depending on the bearing capacity of the structure foundation ground and other various situations.

Tables 5 to 9 show results of experiments made on various parameters, including the strength (CBR), depending on the above combinations of the Iron-Lime stabilized soil. In these Tables, Iron-Lime is a mixture of iron oxide and lime, and Al—Fe—Ti—Ca is a mixture of the Al—Fe—Ti-base oxide and lime.

Incidentally, it has been found that as a result of the studies by the inventor over many years, the theoretical calculation on condition of the compressive strength=0.225× CBR and the modulus of deformation=CBR×100 can be applied to these cases.

Table 5 shows results measured when changing the mixing ratio of Iron-Lime to natural soil. As is seen from Table 5, the modulus of deformation (CBR) does not reach 21,000 for any specimens after the specimens have been immersed in water for 4 days. Table 6 shows results obtained for the specimen added with 5% of iron in Table 5 when prolonging the curing period of the specimen immersed in water. As is seen from Table 6, the modulus of deformation (the modulus of elasticity) reaches 21,000 after the specimen has been immersed in water for 28 days.

Table 7 shows results of measurement made on specimens which were prepared by mixing, at various ratios, a mixture of natural soil and broken stones at the ratio of 60:40 (base soil) with a mixture (Iron-Lime) of a lime mixture of unslaked lime 1: slaked lime 2: limestone powder 1 and iron oxide powder produced as smoke from a smelting furnace and having a particle size not larger than 1/1000 mm at the ratio of 4:1, and which have been immersed in water for 28 days. Comparing the results of Table 7 with Table 5, it is found that by adding broken stones, the modulus of deformation is increased even when using a small amount of the Iron-Lime.

Table 8 shows results of experiments made on specimens prepared by using decomposed granite soil as natural soil and mixing it with the Iron-Lime or the Al—Fe—Ti-base oxide and lime. Furthermore, Table 9 shows results of experiments made on specimens prepared by using Shirasu or siliceous sand instead of decomposed granite soil. It is understood from Table 9 that if the Al—Fe—Ti-base oxide is added, shirasu or siliceous sand can also be employed in the process of the present invention.

<EMBODIMENTS>

[Embodiment 1]
A first embodiment will be described.

Structure to be constructed (=contact area):
length 40 m×width 100 m, 5-floor structure
Ground contact pressure: 5 tonf/m$^2$=0.5 kgf/cm$^2$
Strength of existing ground: CBR=0.4%
Bearing capacity of existing ground:
0.225×CBR=0.09 kgf/cm$^2$ Table 10 shows the depth Z necessary for reducing the ground contact pressure down to a value not larger than the bearing capacity of the existing ground with respect to the load stress imposed by the constructed structure. In Table 10, Z is the depth at which the load stress acting upon the center of the contact is equal to the bearing capacity of the existing ground, i.e., 0.09 kgf/cm$^2$, h is the thickness of the Iron-Lime stabilized soil required, and E is the modulus of deformation (=100×CBR) of the Iron-Lime stabilized layer.

As is apparent from Table 10, when the No. 3 soil (CBR=262) in Table 7 is used as the Iron-Lime stabilized soil, for example, h=1,040 cm is resulted in the case of not dividing the contact area at all, and h=200 cm is results in the case of dividing the contact area into lots, each being 10 m×12.5 m by steel sheet piles. Also, when the No. 3 soil (CBR=380.0) in Table 9 is used on an assumption that the modulus of deformation of the Iron-Lime stabilized layer will rise to about E=40,000 in expectation of an increase in the CBR value after the construction, h=900 cm results in the case of not dividing the contact area at all, and h=170 cm results in the case of dividing the contact area into lots, each being 10 m×12.5 m, by steel sheet piles.

[Embodiment 2]
A second embodiment will be described. When carrying out the invention of the second embodiment, any suitable one of various kinds of the Iron-Lime stabilized soil shown in Tables 5 to 9 is selected and deposited to fill up a contact portion of 2 m or more between the structure and the pile foundation so as to form an Iron-Lime stabilized layer. Generally, since the ground is excavated during the foundation work, the Iron-Lime stabilized soil is used as refill soil at the time of refilling the pile foundation.

Figure 2:
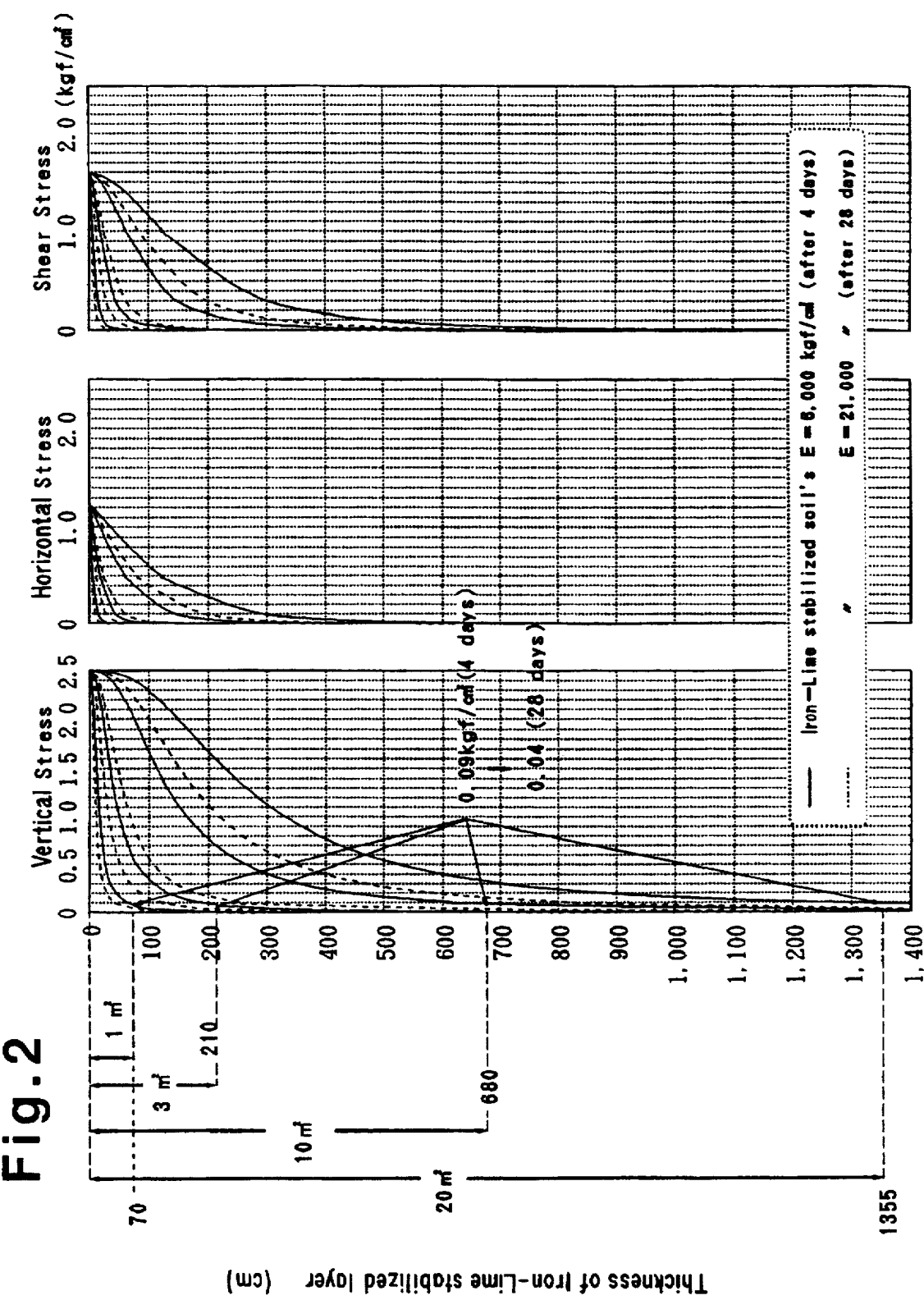
FIG. 2 is a graph showing the relationship between the thickness of an Iron-Lime stabilized layer, the area of each division of the foundation ground, and distribution of stress for a 25-floor structure corresponding to Table 11.

[Embodiment 3]
A third embodiment of claim 2 will be described. Table 11 and FIG. 2 show cases of dividing the foundation ground into small lots by steel sheet piles when 25-floor and 10-floor structures are built up on similar to that in Embodiment 1. The conditions of design are as follows.

Structure to be constructed: 25-floor structure ground contact pressure=2.5 kgf/cm$^2$
Structure to be constructed: 10-floor structure ground contact pressure=1.0 kgf/cm$^2$
The other conditions are the same as in Embodiment 1.

As is seen from Table 11, since the load is dispersed (disappeared) in a shallow layer (at a depth to several meters from the ground surface) by dividing the contact area into small lots, the process of the present invention can be satisfactorily carried out by employing even the Iron-Lime stabilized soil which has a relatively small CBR value, such as No. 1 soil (CBR=218) in Table 7 or soil (CBR=235) in the combination of Iron-Lime and shirasu in Table 9.

Also, as is apparent from Table 11 and FIG. 2, dividing the contact area into small lots makes it possible to construct a multistory building on the soft ground (CBR=0.4%) in consideration of the safety factor as well, as a result of reinforcing the shallow layer at the depth of 4 to 5 m from the ground surface with the aid of steel sheet piles and the Iron-Lime stabilized soil.

As described above, in the process of preventing liquefaction of the structure foundation ground according to the present invention, the depth at which the load stress due to a structure to be constructed is equal to the bearing capacity of the existing ground is determined, the equivalent depth converted from the aforesaid depth on an assumption that the modulus of deformation is 21,000 kgf/cm$^2$ is determined, and a refilled portion of the structure underground corresponding to the equivalent depth is formed as the Iron-Lime stabilized layer. Therefore, the Iron-Lime stabilized soil serves as a non-liquefying layer to restrain the liquefiable ground, thereby suppressing displacement and deformation of the existing ground. Also, the bearing capacity of the Iron-Lime stabilized soil is increased with the elapse of days after the construction, which contributes to sustain not only the internal balance but also the balance with respect to external forces, and hence to prevent the structure from falling down in the event of earthquakes.

Further, with the process of the present invention, a contact portion of 2 m or more between the structure and the pile foundation is formed as the Ferrum-Lime stabilized layer having a modulus of deformation not less than 21,000 kgf/cm$^2$. In addition to the above advantages, it is possible to prevent the structure supported on the pile foundation from swinging or gyrating like a pendulum or a dish in the dish-spinning trick in the event of a big earthquake.

TABLE 1

The Mechanical Relationship in the Layer System
The Balance between the Pisa Tower and The Foundation Ground (A) Assumptive modulus of deformation of the Sand layer (10 m)
($E_1$) = 1,500

| | | | | | |
|---|---|---|---|---|---|
| Assumptive CBR of Underlayer | % | 2.2 | 2.3 | 2.4 | *2.5 |
| i. The thickness: $h_x$ converted 10 m | m | 18.96 | 18.68 | 18.42 | 18.17 |
| ii. Vertical stress by formula-(3) | kgf/cm$^2$ | 0.531 | 0.542 | 0.553 | 0.564 |
| iii. CBR converted by formula-(2) | % | 2.35 | 2.40 | 2.45 | 2.50 |

(B) Assumptive modulus of deformation of the Sand layer (10 m)
($E_1$) = 6,000

| | | | | | |
|---|---|---|---|---|---|
| Assumptive CBR of Underlayer | % | 0.1 | 0.3 | *0.4 | 0.5 |
| i. The thickness: $h_x$ converted 10 m | m | 84.34 | 58.48 | 53.13 | 49.32 |
| ii. Vertical stress by formula-(3) | kgf/cm$^2$ | 0.036 | 0.073 | 0.088 | 0.101 |
| iii. CBR converted formula(2) | % | 0.16 | 0.32 | 0.39 | 0.44 |

TABLE 3

Mean Modulus of Deformation (Es) and the settlement at each point of Ground

| Contact Area | Point | Es = 6,000 kgf/cm$^2$ | Es = 10,000 kgf/cm$^2$ | Es = 20,000 kgf/cm$^2$ | Es = 40,000 kgf/cm$^2$ |
|---|---|---|---|---|---|
| 40 m | O | 3.06 mm | 1.83 mm | 0.91 mm | 0.45 mm |
| × | A | 1.53 | 0.91 | 0.45 | 0.22+ee |
| 80 m | B | +e,uns 2.24 | 1.34 | 0.67 | 0.33+ee |
| | C | +e,uns 1.94 | 1.17 | 0.58 | 0.29+ee |
| 20 m | O | +e,uns 1.53 | 0.91 | 0.45 | 0.22+ee |
| × | A | +e,uns 0.76 | 0.45 | 0.22 | 0.11+ee |
| 40 m | B | +e,uns 1.12 | 0.67 | 0.33 | 0.16+ee |
| | C | +e,uns 0.98 | 0.58 | 0.29 | 0.14+ee |
| 20 m | O | +e,uns 1.12 | 0.67 | 0.33 | 0.16+ee |
| × | A | +e,uns 0.56 | 0.33 | 0.16 | 0.08+ee |
| 20 m | B | +e,uns 0.76 | 0.45 | 0.22 | 0.11+ee |
| | C | +e,uns 0.76 | 0.45 | 0.22 | 0.11 |

O; Center of structure, A; Corner, B-C; Center of the each side

TABLE 2

The Balance in the Foundation Structure
The Surface Settlement in each point and Vertical Stress ( ) Underground

| Mean Modulus of Deformation (Es) | | Es = 6,000 (kgf/cm$^2$) | | Es = 10,000 (kgf/cm$^2$) | | Es = 21,000 (kgf/cm$^2$) | | Es = 40,000 (kgf/cm$^2$) |
|---|---|---|---|---|---|---|---|---|
| Contact Area & Each Point | | Settlement | Vertical Stress (σz) | Settlement | Vertical Stress (σz) | Settlement | Vertical Stress (σz) | Settlement |
| 17.72 m × 17.72 m | Corner | 2.16 mm | 0.077 kgf/cm$^2$ | 1.29 mm | 0.024 kgf/cm$^2$ | 0.61 mm | 0.007 kgf/cm$^2$ | 0.32 |
| | Both side (center) | 2.95 | 0.082 | 1.77 | 0.025 | 0.84 | 0.007 | 0.44 |
| | Center of Structure | 4.32 | 0.088 | 2.59 | 0.025 | 1.23 | 0.0007 | 0.65 |

Remark:
① Uniform load (q) = 1.74 kgf/cm$^2$
② Poisson's ratio (μ = 0.5)
③ Settlement for 10 m = 10$^{-3}$ m = 10 mm

TABLE 4

| Contact area of structure E of Foundation ground | 6,000 (kgf/cm²) | | | 17.72 (m) × 8.86 (m) 10,000 (kgf/cm²) Stress at the center | | | 21,000 (kgf/cm²) | | |
|---|---|---|---|---|---|---|---|---|---|
| Depth | Vertial | Horizontal | Shear | Vertial | Horizontal | Shear | Vertial | Horizontal | Shear |
| 1 (m) | 1.218 | 0.376 | 0.605 | 0.732 | 0.118 | 0.253 | 0.284 | 0.017 | 0.060 |
| 2 | 0.698 | 0.106 | 0.235 | 0.271 | 0.015 | 0.056 | 0.082 | 0.001 | 0.009 |
| 3 | 0.402 | 0.034 | 0.101 | 0.133 | 0.004 | 0.019 | 0.037 | 0 | 0.003 |
| 4 | 0.253 | 0.013 | 0.050 | 0.077 | 0.001 | 0.008 | 0.021 | 0 | 0.001 |
| 5 | 0.171 | 0.006 | 0.028 | 0.050 | 0 | 0.004 | 0.014 | 0 | 0 |
| 6 | 0.123 | 0.003 | 0.017 | 0.035 | 0 | 0.002 | 0.009 | 0 | 0 |
| *7 | 0.088 | 0.002 | 0.001 | 0.026 | 0 | 0.001 | 0.007 | 0 | 0 |

| Contact area of structure E of Foundation ground | 6,000 (kgf/cm²) | | | 8.82 (m) × 8.86 (m) 10,000 (kgf/cm²) Stress at the center | | | 21,000 (kgf/cm²) | | |
|---|---|---|---|---|---|---|---|---|---|
| Depth | Vertial | Horizontal | Shear | Vertial | Horizontal | Shear | Vertial | Horizontal | Shear |
| 1 (m) | 1.058 | 0.137 | 0.358 | 0.491 | 0.261 | 0.101 | 0.162 | 0.003 | 0.018 |
| 2 | 0.449 | 0.022 | 0.088 | 0.151 | 0.002 | 0.016 | 0.043 | 0 | 0.002 |
| 3 | 0.228 | 0.005 | 0.031 | 0.070 | 0 | 0.005 | 0.019 | 0 | 0.001 |
| 4 | 0.135 | 0.002 | 0.014 | 0.040 | 0 | 0.002 | 0.011 | 0 | 0 |
| *5 | 0.088 | 0.001 | 0.007 | 0.026 | 0 | 0.001 | 0.007 | 0 | 0 |

TABLE 5

| Amount of additives | Water Content (%) | Wet density (g/cm³) | Dry density (g/cm³) | C. B. R (%) |
|---|---|---|---|---|
| 3% | 11.1 | 1.931 | 1.144 | 12 |
| 5% | 10.8 | 1.929 | 1.141 | 100 |
| 7% | 10.6 | 1.919 | 1.135 | 112 |
| 9% | 10.4 | 1.900 | 1.121 | 104 |

REMARK:
① Additives; Iron Lime mixtures
② Surcharge weight: 10 kg
③ The molded specimens are compacted in 5 layers, undergoing 20 blows.
④ The CBR value is measured after the specimens have been immersed in water at 20° C. ± 3° C. for 4 days.

TABLE 6

| Curing period (immersed in water | 4 days | 7 days | 28 days | 3 months |
|---|---|---|---|---|
| C. B. R. (%) | 100 | 120 | 210 | 310 |
| Modulus of elasticity (kgf/cm²) | 10000 | 12000 | 21000 | 31000 |

TABLE 7

| Sample No. | Mixing ratio Soils Iron Lime | Weight of the wet sample (g) | Volume of mold (cm³) | Moisture content (%) | Wet density $\gamma t$ (g/cm³) | Dry density $\gamma d$ (g/cm³) | C.B.R. (%) |
|---|---|---|---|---|---|---|---|
| 1 | 98.5: 1.5 | 4930 | 2209 | 7.0 (11.5) | 2.232 | 2.086 | 218 |
| 2 | 96.5: 3.5 | 4910 | 2209 | 6.9 (11.2) | 2.223 | 2.079 | 240 |
| 3 | 94.5: 5.5 | 4880 | 2209 | 6.7 (10.7) | 2.209 | 2.070 | 262 |
| 4 | 92.5: 7.5 | 4840 | 2209 | 6.6 (10.5) | 2.191 | 2.055 | 254 |

TABLE 8

| Factors of mixtures and qualities | | Curing period (immersed in water) (days) | | | | | |
|---|---|---|---|---|---|---|---|
| | | Just after not in water | 4 days | 14 days | 28 days | 60 days | 120 days |
| Iron-Lime | Water content for compaction (%) | 13.7 | 13.1 | 13.1 | 12.9 | 12.8 | 13.2 |
| | Dry density (g/cm³) | 1,690 | 1,704 | 1,698 | 1,713 | 1,705 | 1,693 |
| | C.B.R. (%) | 50.5 | 156.3 | 242.0 | 255.6 | 289.2 | 349.0 |
| Al—Fe—Ti—Ca (No. 1) | Water content for compaction (%) | 12.9 | 12.8 | 12.8 | 12.6 | 13.2 | 13.3 |
| | Dry density (g/cm³) | 1,709 | 1,686 | 1,673 | 1,687 | 1,676 | 1,667 |
| | C.B.R. (%) | 55.0 | 216.4 | 287.3 | 315.0 | 350.1 | 393.2 |
| Al—Fe—Ti—Ca (No. 2) | Water content for compaction (%) | 12.8 | 12.9 | 12.8 | 13.1 | 13.2 | 13.2 |
| | Dry density (g/cm³) | 1,710 | 1,685 | 1,673 | 1,680 | 1,676 | 1,669 |
| | C.B.R. (%) | 60.4 | 254.5 | 314.8 | 341.0 | 380.2 | 423.5 |
| Al—Fe—Ti—Ca (No. 3) | Water content for compaction (%) | 12.9 | 12.9 | 12.8 | 13.2 | 13.1 | 13.3 |
| | Dry density (g/cm³) | 1,665 | 1,665 | 1,668 | 1,674 | 1,661 | 1,661 |
| | C.B.R. (%) | 60.7 | 280.2 | 360.8 | 380.0 | 429.4 | 461.8 |

TABLE 9

| | Natural soils | | | | |
|---|---|---|---|---|---|
| | Decomposed granite soil | | Shirasu | | Siliceous and |
| Factors of mixtures | C.B.R. (%) | qu (kgf/cm²) | C.B.R. (%) | qu (kgf/cm²) | C.B.R. (%) |
| Ferrum-Lime | 156.3 | 7.1 | 113.0 | 6.0 | 25.5 |
| | 255.6 | 13.2 | 235.0 | 12.8 | 142.5 |
| Al—Fe—Ti—Ca (No. 1) | 216.4 | 9.6 | 156.0 | 9.3 | 45.0 |
| | 315.0 | 16.2 | 292.0 | 18.3 | 199.5 |
| Al—Fe—Ti—Ca (No. 2) | 254.5 | 10.5 | 190.7 | 12.2 | 55.0 |
| | 341.0 | 17.4 | 338.4 | 22.2 | 308.0 |
| Al—Fe—Ti—Ca (No. 3) | 280.2 | 11.8 | 215.4 | 15.5 | 66.5 |
| | 380.0 | 19.4 | 362.8 | 27.0 | 360.5 |

REMARK:
① qu; Unconfined compressive strength
② The upper row shows the values that are measured after the specimens have been immersed in water for 4 days. The lowers shows the values that are measured after the specimens have been immersed in water for 28 days.

TABLE 10

| Division of foundation ground | z (cm) | h (cm) | | |
|---|---|---|---|---|
| | | E = 10,000 | E = 26,000 | E = 40,000 |
| 40 m × 100 m | 9,000 | 1,430 | 1,040 | 900 |
| 40 × 50 | 6,600 | 1,050 | 760 | 660 |
| 40 × 25 | 4,650 | 740 | 540 | 465 |
| 20 × 25 | 3,300 | 530 | 380 | 330 |
| 10 × 12.5 | 1,700 | 270 | 200 | 170 |

Remark:
z; Depth of existing homogenous ground
h; Thickness of stabilized soil

TABLE 11

Conditions of design (1) Uniform load; 25-floors-structure: 25 tonf/m² = 2.5 kgf/cm², 10-floors: 10 tonf/m² = 1 kgf/cm²
(2) Thickness of Iron Lime stabilized layer (equivalant-depth method by Barber)
   ① Vertical stress below Iron Lime stabilized layer ≦ The bearing capacity of Soft ground
   ② Modulus of Elasticity (kgf/cm²) of Iron Lime stabilized soil is
   E = 6,000 (after 4 days curing), E = 21,000 (after 28 days curing)
(3) The bearing vertical capacity of Soft ground (≈ buoyancy) = 0.225 × CBR (= 0.4%) = 0.09 kgf/cm²

| System of Foundation | 25-floors-structure 2.5 kgf/cm² Dead load | | | | | 10-floors-structure 1 kgf/cm² | | | | |
|---|---|---|---|---|---|---|---|---|---|---|
| Divison of Foundation | 1 m² | 3 m² | 5 m² | 10 m² | 20 m² | 1 m² | 3 m² | 5 m² | 10 m² | 20 m² |
| Bearing Capacity of Soft Ground | | | | | 0.09 kgf/cm² (CBR 0.4%) | | | | | |
| Depth of vertical stress ≦0.09 | 360 (cm) | 1,100 | 1,800 | 3,600 | 7,200 | 230 (cm) | 680 | 1,110 | 2,250 | 4,500 |
| Thickness of Iron   E = 6,000 | 70 (cm) | 210 | 340 | 680 | 1,355 | 45 (cm) | 130 | 210 | 425 | 847 |
| Lime stabilized layer   E = 21,000 | 45 (cm) | 136 | 225 | 450 | 900 | 30 (cm) | 85 | 140 | 280 | 560 |

What is claimed is:

1. A process of preventing liquefaction of a structure foundation ground, the process comprising the steps of determining a depth at which a load stress created by a structure to be constructed on the foundation ground is equal to the bearing capacity of an existing (original) ground, determining an equivalent depth converted from said depth on an assumption that the modulus of deformation is 21,000 kgf/cm², and forming a stabilized layer underneath the structure underground corresponding to said equivalent depth; the stabilized layer comprising a first component selected from the group consisting of:

natural soil, and natural soil and broken stones, and a second component selected from the group consisting of iron oxide and lime, and an Al—Fe—Ti-base oxide and lime, said Al—Fe—Ti-base oxide being selected from the group consisting of an Al—Fe—Ti-base oxide composition substantially of aluminum oxide, iron oxide and titanium oxide and a mixture of aluminum oxide, iron oxide and titanium oxide.

2. The process according to claim 1, further comprising dividing said stabilized layer using steel sheet piles to yield a plurality of divisions each having a desired area.

3. A process of preventing liquefaction of a structure foundation ground comprising forming a contact portion of 2 m or more between a structure and a pile foundation; the contact portion being a layer of stabilized soil having a modulus of deformation not less than 21,000 kgf/cm² and comprising an iron-lime stabilized soil having a first component selected from the group consisting of:

natural soil, and natural soil and broken stones, and a second component selected from the group consisting of iron oxide and lime, and a Al—Fe—Ti-base oxide and lime.

4. The process according to claim 3, further comprising dividing said Iron-Lime stabilized layer using steel sheet piles to yield a plurality of divisions each having a desired area, and driving in a desired number of foundation piles for each of the divisions.

* * * * *